US012772252B2

(12) United States Patent
Matsumura et al.

(10) Patent No.: US 12,772,252 B2
(45) Date of Patent: Oct. 20, 2026

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 476 days.

(21) Appl. No.: 17/630,348

(22) PCT Filed: Aug. 8, 2019

(86) PCT No.: PCT/JP2019/031526

§ 371 (c)(1),
(2) Date: Jan. 26, 2022

(87) PCT Pub. No.: WO2021/024494

PCT Pub. Date: Feb. 11, 2021

(65) Prior Publication Data

US 2022/0322410 A1 Oct. 6, 2022

(51) Int. Cl.
*H04W 72/23* (2023.01)
*H04W 72/51* (2023.01)

(52) U.S. Cl.
CPC ........... *H04W 72/23* (2023.01); *H04W 72/51* (2023.01)

(58) Field of Classification Search
CPC ............. H04W 72/20-232; H04B 7/04; H04B 7/0404; H04B 7/0408
See application file for complete search history.

(56) References Cited

U.S. PATENT DOCUMENTS

| | | | | |
|---|---|---|---|---|
| 10,826,568 | B1 * | 11/2020 | Zhou | H04B 7/0695 |
| 11,057,166 | B2 * | 7/2021 | Nam | H04L 5/0023 |
| 11,096,211 | B2 * | 8/2021 | Jung | H04W 72/1268 |
| 11,284,385 | B2 * | 3/2022 | Lo | H04J 13/16 |
| 11,337,203 | B2 * | 5/2022 | Raghavan | H04L 5/0091 |
| 12,016,035 | B2 * | 6/2024 | Takahashi | H04L 5/0091 |
| 12,207,253 | B2 * | 1/2025 | Matsumura | H04L 5/0051 |
| 2019/0141693 | A1 | 5/2019 | Guo et al. | |
| 2019/0260458 | A1 * | 8/2019 | Zhou | H04W 72/046 |

(Continued)

OTHER PUBLICATIONS

"5G/NR—MAC CE", Retrieved from: https://web.archive.org/web/20190402033945/http://www.sharetechnote.com/html/5G/5G_MAC_CE_TCI_State_PDSCH.html, Apr. 2, 2019.*

(Continued)

*Primary Examiner* — Brendan Y Higa
(74) *Attorney, Agent, or Firm* — Osha Bergman Watanabe & Burton LLP

(57) ABSTRACT

A terminal according to one aspect of the present disclosure includes a receiving section that receives a plurality of downlink shared channels (Physical Downlink Shared Channels (PDSCHs)) on the basis of one piece of downlink control information, and a control section that judges that a default transmission configuration indication state (TCI state) applied to the plurality of the PDSCHs corresponds to a TCI state corresponding to a code point in a TCI field for the downlink control information. According to one aspect of the present disclosure, it is possible to perform DL communication preferably even when multiple panels/TRPs are used.

5 Claims, 13 Drawing Sheets

(56) References Cited

U.S. PATENT DOCUMENTS

| | | | | |
|---|---|---|---|---|
| 2019/0260524 | A1* | 8/2019 | Nam | H04L 25/0258 |
| 2019/0297637 | A1* | 9/2019 | Liou | H04W 72/1273 |
| 2019/0297640 | A1* | 9/2019 | Liou | H04L 5/001 |
| 2019/0313429 | A1* | 10/2019 | Cheng | H04W 76/27 |
| 2019/0349915 | A1* | 11/2019 | Ahn | H04L 5/0048 |
| 2020/0015200 | A1* | 1/2020 | Vilaipornsawai | H04L 1/1819 |
| 2020/0045700 | A1* | 2/2020 | Sun | H04L 5/0091 |
| 2020/0077283 | A1* | 3/2020 | Zhou | H04W 24/04 |
| 2020/0106645 | A1* | 4/2020 | Tsai | H04B 7/022 |
| 2020/0107353 | A1* | 4/2020 | Jung | H04B 7/0689 |
| 2020/0112941 | A1* | 4/2020 | Yerramalli | H04W 72/30 |
| 2020/0229161 | A1* | 7/2020 | Raghavan | H04L 5/0048 |
| 2020/0267734 | A1* | 8/2020 | Khoshnevisan | H04L 5/0053 |
| 2020/0296704 | A1* | 9/2020 | Vilaipornsawai | H04L 1/1819 |
| 2020/0337058 | A1* | 10/2020 | Song | H04L 5/10 |
| 2020/0351892 | A1* | 11/2020 | Yi | H04W 72/53 |
| 2021/0051635 | A1* | 2/2021 | Lo | H04W 72/23 |
| 2021/0051693 | A1* | 2/2021 | Liou | H04W 72/1273 |
| 2021/0058906 | A1* | 2/2021 | Seo | H04L 5/0053 |
| 2021/0091900 | A1* | 3/2021 | Zhang | H04L 5/0044 |
| 2021/0105053 | A1* | 4/2021 | Cheng | H04B 7/0617 |
| 2021/0112583 | A1* | 4/2021 | Gao | H04W 72/0446 |
| 2021/0135741 | A1* | 5/2021 | Zhou | H04B 7/088 |
| 2021/0136802 | A1* | 5/2021 | Cirik | H04B 7/0695 |
| 2021/0136807 | A1* | 5/2021 | Yang | H04L 1/18 |
| 2021/0337572 | A1* | 10/2021 | Ji | H04W 72/0446 |
| 2021/0337584 | A1* | 10/2021 | Zhang | H04W 72/23 |
| 2021/0385847 | A1* | 12/2021 | Kang | H04B 7/06968 |
| 2022/0053544 | A1* | 2/2022 | Kang | H04B 7/0626 |
| 2022/0061080 | A1* | 2/2022 | Takeda | H04L 5/0044 |
| 2022/0069957 | A1* | 3/2022 | Lee | H04W 72/23 |
| 2022/0095350 | A1* | 3/2022 | Lee | H04L 1/0003 |
| 2022/0103325 | A1* | 3/2022 | Chen | H04L 5/0035 |
| 2022/0104237 | A1* | 3/2022 | Muruganathan | H04W 72/51 |
| 2022/0124768 | A1* | 4/2022 | Frenne | H04L 1/08 |
| 2022/0174708 | A1* | 6/2022 | Kim | H04L 1/1893 |
| 2022/0191892 | A1* | 6/2022 | Muruganathan | H04W 72/23 |
| 2022/0255703 | A1* | 8/2022 | Song | H04L 5/0035 |
| 2023/0083208 | A1* | 3/2023 | Zhang | H04B 7/0695<br>370/329 |
| 2023/0300834 | A1* | 9/2023 | Blankenship | H04W 72/23<br>370/329 |

OTHER PUBLICATIONS

5G; NR; Physical layer procedures for data (3GPP TS 38.214 version 15.6.0 Release 15), ETSI TS 138 214 V15.6.0, Jul. 2019.*

Extended European Search Report issued in European Application No. 19940578.8, mailed on Apr. 5, 2023 (8 pages).

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

3GPP TSG RAN WG1 #97; R1-1906236 "Enhancements on Multi-TRP and Multi-panel Transmission" ZTE; Reno, USA; May 13-17, 2019 (5 pages).

3GPP TSG RAN WG1 #98; R1-1909201 "Enhancements on multi-TRP/panel transmission" NTT DOCOMO, Inc.; Prague, CZ; Aug. 26-30, 2019 (5 pages).

International Search Report issued in International Application No. PCT/JP2019/031526, mailed Feb. 25, 2020 (3 bages).

Written Opinion issued in International Application No. PCT/JP2019/031526; Dated Feb. 25, 2020 (3 pages).

* cited by examiner

| TCI CODE POINT | TCI STATE |
|---|---|
| 000 | T2 |
| 001 | T0 & T1 |
| 010 | T5 |
| 011 | T8 |
| 100 | T10 & T11 |
| 101 | T14 |
| 110 | T16 |
| 111 | T22 & T23 |

| TCI CODE POINT | TCI STATE |
|---|---|
| 000 | T2 |
| 001 | T0 & T1 |
| 010 | T5 |
| 011 | T8 |
| 100 | T10 & T11 |
| 101 | T14 |
| 110 | T16 |
| 111 | T22 & T23 |

| TCI CODE POINT | TCI STATE |
|---|---|
| 000 | T0 |
| 001 | T2 & T4 |
| 010 | T5 |
| 011 | T8 |
| 100 | T10 & T1 |
| 101 | T14 |
| 110 | T16 |
| 111 | T22 & T23 |

| TCI CODE POINT | TCI STATE |
|---|---|
| 000 | T2 |
| 001 | T0 & T1 |
| 010 | T5 |
| 011 | T8 |
| 100 | T10 & T11 |
| 101 | T14 |
| 110 | T16 |
| 111 | T22 & T23 |

| TCI CODE POINT | TCI STATE |
|---|---|
| 000 | T2 |
| 001 | T0 & T1 |
| 010 | T5 |
| 011 | T8 |
| 100 | T10 & T11 |
| 101 | T14 |
| 110 | T16 |
| 111 | T22 & T23 |

| TCI CODE POINT | TCI STATE |
|---|---|
| 000 | T2 |
| 001 | T0 & T3 |
| 010 | T5 |
| 011 | T8 |
| 100 | T4 & T1 |
| 101 | T14 |
| 110 | T16 |
| 111 | T22 & T23 |

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (e.g., NR), a user terminal (User Equipment (UE)) that controls transmission/reception processing on the basis of information related to Quasi-Co-Location (QCL) is under study.

For NR, one or a plurality of transmission/reception points (TRPs) (multiple TRPs) that perform DL transmission (e.g., PDSCH transmission) to the UE by using one or a plurality of panels (multiple panels) is under study.

However, in NR specifications thus far, multiple panels/TRPs are not considered, and thus an QCL assumption in a case where the multiple panels/TRPs are used cannot be appropriately controlled. Accordingly, following existing NR specifications cannot preferably achieve spatial diversity gain, high rank transmission, and the like in a case where the multiple panels/TRPs are used, and thus an increase in communication throughput may be suppressed.

Thus, an object of the present disclosure is to provide a terminal and a radio communication method that can perform DL communication preferably even when multiple panels/TRPs are used.

Solution to Problem

A terminal according to one aspect of the present disclosure includes a receiving section that receives a plurality of downlink shared channels (Physical Downlink Shared Channels (PDSCHs)) on the basis of one piece of downlink control information, and a control section that judges that a default transmission configuration indication state (TCI state) applied to the plurality of the PDSCHs corresponds to a TCI state corresponding to a code point in a TCI field for the downlink control information.

Advantageous Effects of Invention

According to one aspect of the present disclosure, it is possible to perform DL communication preferably even when multiple panels/TRPs are used.

Figure 1:
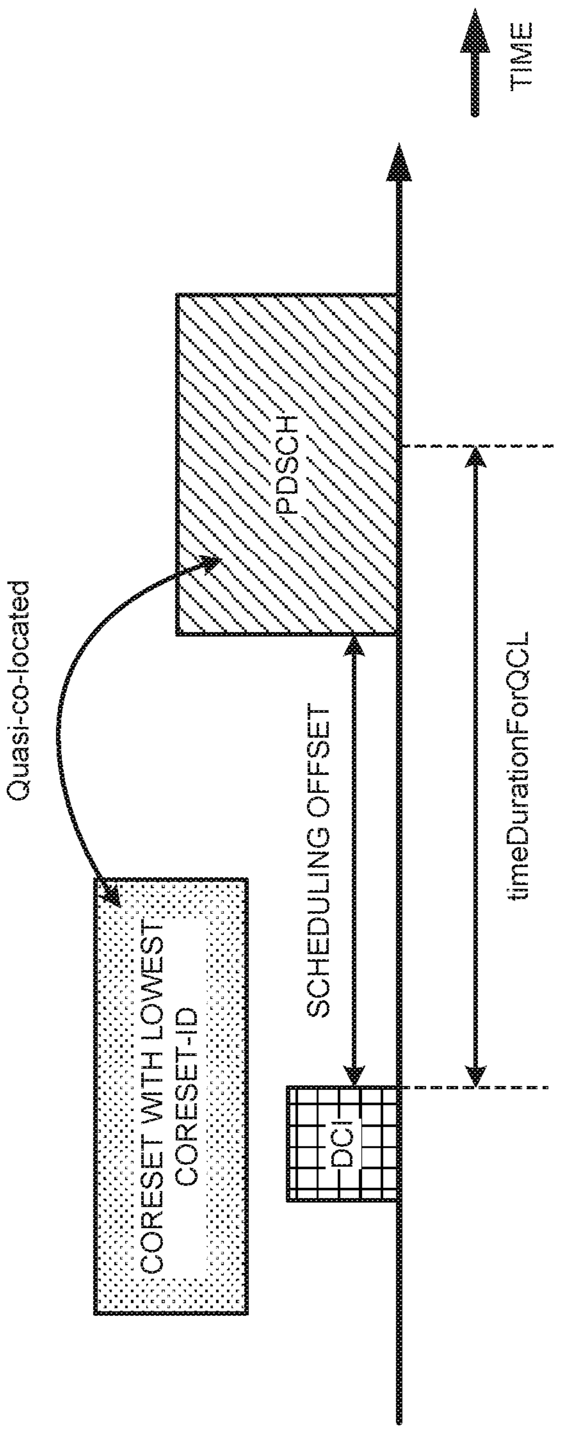
FIG. 1 is a diagram to show an example of an QCL assumption for a DMRS port for a PDSCH.

DESCRIPTION OF EMBODIMENTS (TCI, Spatial Relation, QCL)

For NR, a UE that controls reception processing (e.g., at least one of reception, demapping, demodulation, and decoding) and transmission processing (e.g., at least one of transmission, mapping, precoding, modulation, and coding) of at least one of a signals and a channel (which may be expressed as a signal/channel; in the present disclosure, "A/B" may be similarly interpreted as "at least one of A and B") on the basis of a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information (SRI), or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sac (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A: Doppler shift, Doppler spread, average delay, and delay spread,

QCL type B: Doppler shift and Doppler spread,

QCL type C: Doppler shift and Average delay, and

QCL type D: Spatial reception parameter.

Types A to C may correspond to QCL information related to synchronization processing of at least one of time and frequency, and type D may correspond to QCL information related to beam control.

A case that the UE assumes that a certain control resource set (CORESET), channel, or reference signal is in a relationship of specific QCL (for example, QCL type D) with another CORESET, channel, or reference signal may be referred to as QCL assumption.

The UE may determine, on the basis of the TCI state or the QCL assumption for the signal/channel, at least one of a transmit beam (Tx beam) and a receive beam (Rx beam) of the signal/channel.

The TCI state may be, for example, information related to QCL between a channel as a target (or a reference signal (RS) for the channel) and another signal (for example, another downlink reference signal (DL-RS)). The TCI state may be configured (indicated) by higher layer signaling or physical layer signaling, or a combination of these.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit y (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS (DL-RS) to have a QCL relationship with the channel may be, for example, at least one of a synchronization signal block (SSB), a channel state information reference signal (CSI-RS), and a reference signal for measurement (Sounding Reference Signal (SRS)). Alternatively, the DL-RS may be a CSI-RS used for tracking (also referred to as a Tracking Reference Signal (TRS)), or a reference signal used for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element ("TCI-state IE" of the RRC) of the TCI state configured by the higher layer signaling may include one or a plurality of pieces of QCL information ("QCL-Info"). The QCL information may include at least one of information related to the DL-RS to have a QCL relationship (DL-RS relation information) and information indicating a QCL type (QCL type information). The DL-RS relation information may include information such as an index of the DL-RS (for example, an SSB index, or a non-zero power CSI-RS (NZP CSI-RS) resource ID (Identifier)), an index of a cell in which the RS is located, and an index of a Bandwidth Part (BWP) in which the RS is located.

<TCI State for PDCCH>

Information related to the QCL between the PDCCH (or a DMRS antenna port related to the PDCCH) and a certain DL-RS may be referred to as a TCI state for the PDCCH or the like.

The UE may determine the TCI state for a UE-specific PDCCH (CORESET), based on higher layer signaling.

In the present disclosure, the higher layer signaling may be, for example, any one of RRC (Radio Resource Control) signaling, MAC (Medium Access Control) signaling, broadcast information, and the like, or a combination of these.

For example, the MAC signaling may use MAC control elements (MAC CE), MAC PDUs (Protocol Data Units), and the like. For example, the broadcast information may be master information blocks (MIBs), system information blocks (SIBs), minimum system information (PSI (Remaining Minimum System Information)), and the like.

For example, one or a plurality of (K) TCI states may be configured for the UE for each CORESET by using RRC signaling (ControlResourceSet information element). The UE may activate each of the one or the plurality of TCI states for each CORESET by using the MAC CE. The MAC CE may be referred to as a TCI state indication MAC CE for UE-specific PDCCH (TCI State Indication for UE-specific PDCCH MAC CE). The UE may perform monitoring of the CORESET, based on an active TCI state corresponding to the CORESET.

<TCI State for PDSCH>

Information related to the QCL between the PDSCH (or a DMRS antenna port related to the PDSCH) and a certain DL-RS may be referred to as a TCI state for the PDSCH or the like.

M (M≥1) pieces of TCI states (M pieces of QCL information for the PDSCH) for the PDSCH may be notified to (configured for) the UE by higher layer signaling. Note that the number M of the TCI states configured for the UE may be limited by at least one of a UE capability and a QCL type.

Downlink control information (DCI) used for scheduling of the PDSCH may include a certain field (which may be referred to as, for example, a TCI field, a TCI state field, and so on) indicating a TCI state for the PDSCH. The DCI may be used for scheduling of a PDSCH in one cell, and may be referred to as, for example, DL DCI, DL assignment, DCI format 1_0, DCI format 1_1, and so on.

Whether the TCI field is included in the DCI may be controlled by information notified from a base station to the UE. The information may be information (e.g., TCI presence information, TCI presence information in DCI, or a higher layer parameter tci-PresentInDCI) indicating whether the TCI field is present or absent in the DCI. For example, the information may be configured for the UE by higher layer signaling.

When the DCI includes an x-bits (e.g., x=3) TCI field, the base station may preconfigure at most $2^x$ (e.g., 8 when x=3) kinds of TCI states for the UE by the higher layer signaling. A value of the TCI field (TCI field value) in the DCI may indicate one of the TCI states preconfigured by the higher layer signaling.

When more than 8 kinds of TCI states are configured for the UE, 8 or less kinds of TCI states may be activated (or designated) with use of a MAC CE. The MAC CE may be referred to as TCI state activation/deactivation for UE-specific PDSCH MAC CE. The value of the TCI field in the DCI may indicate one of the TCI states activated by the MAC CE.

The MAC CE is used for designating a TCI state to be mapped to a TCI field code point of the DCI out of TCI state IDs configured by RRC signaling and activating the TCI state. The activated TCI state may be mapped to the above-described TCI field code point values from 0 to $2^x-1$ (e.g., 7 when x=3) in ascending or descending order of TCI state IDs.

Letting a slot in which the UE transmits HARQ-ACK (Hybrid Automatic Repeat reQuest ACKnowledgement) for the PDSCH that has provided the above-described MAC CE be n, activation/deactivation (mapping between the TCI field in the DCI and the TCI state) based on the MAC CE may be applied from slot n+3*(the number of slots in a subframe)+1. In other words, in slot n+3*(the number of the slots in the subframe)+1, an update on the TCI field code point based on the above-described MAC CE may be enabled.

In a case where the TCI presence information is set to "enabled," when a TCI field in DCI in a component carrier (CC) to schedule (a PDSCH) indicates an activated TCI state in a CC or DL BWP to be scheduled and the PDSCH is scheduled by DCI format 1_1, the UE may use, for determination of QCL of the PDSCH antenna port, a TCI following a TCI field value in a detected PDCCH including the DCI.

In a case where time offset between reception of DL DCI and reception of a PDSCH corresponding to the DCI is equal to or greater than a certain threshold value, the UE may assume that DMRS ports for the PDSCH in a serving cell are QCL with RS(s) in the TCI state with respect to QCL type parameter(s) given by the TCI state indicated by the DCI ("the DM-RS ports of PDSCH of a serving cell are quasi co-located with the RS(s) in the TCI state with respect to the QCL type parameter(s) given by the indicated TCI state").

The time offset between reception of DL DCI and reception of a PDSCH corresponding to the DCI may be referred to as scheduling offset.

The above-described threshold value may be referred to as "Threshold," "Threshold for offset between a DCI indicating a TCI state and a PDSCH scheduled by the DCI," "Threshold-Sched-Offset," "timeDurationForQCL," a schedule offset threshold value, a scheduling offset threshold value, a time length for QCL, and so on.

The scheduling offset threshold value may be based on a UE capability, and may be based on, for example, a delay in decoding of a PDCCH and beam switching. Information about the scheduling offset threshold value may be configured with use of higher layer signaling from the base station, or may be transmitted from the UE to the base station.

When the scheduling offset is more than the scheduling offset threshold value, the UE may assume that DMRS ports for the PDSCH are QCL with RS(s) with respect to QCL parameter(s) given by the TCI state indicated by the DCI.

When the scheduling offset is less than the scheduling offset threshold value, the UE may assume that DM-RS ports for the PDSCH in the serving cell are QCL with RS(s) in the TCI state with respect to QCL parameter(s) used for PDCCH QCL indication corresponding to the lowest CORESET-ID in the latest (most recent) slot in which one or more control resource sets (CORESETs) are configured for the UE within an active BWP (bandwidth part) of the serving cell (the DM-RS ports of PDSCH of a serving cell are quasi co-located with the RS(s) in the TCI state with respect to the QCL parameter(s) used for PDCCH quasi co-location indication of the lowest CORESET-ID in the latest slot in which one or more CORESETs within the active BWP of the serving cell are configured for the UE).

For example, the UE may assume that the DMRS ports for the PDSCH are QCL with a DL-RS based on the TCI state activated with respect to a CORESET corresponding to the above-described lowest CORESET-ID. The latest slot may be, for example, a slot for receiving DCI to schedule the above-described PDSCH.

Note that the CORESET-ID may be an ID (ID for CORESET identification) configured by an RRC information element "ControlResourceSet."

FIG. 1 is a diagram to show an example of the QCL assumption for the DMRS ports for the PDSCH. In the present example, the scheduling offset is less than the scheduling offset threshold value. Accordingly, the UE may assume that the DMRS ports for the PDSCH are QCL with an RS (e.g., a DMRS for a PDCCH) in a TCI state for a PDCCH corresponding to the lowest CORESET-ID in the latest slot.

When a single-slot PDSCH is configured for the UE, the indicated TCI state may be based on an activated TCI state in a slot with the scheduled PDSCH. When a multi-slot PDSCH is configured for the UE, the indicated TCI state may be based on an activated TCI state in the first slot with the scheduled PDSCH, and the UE may expect that the indicated TCI state is identical through slots with the scheduled PDSCH.

In a case where a CORESET associated with a search space set for cross-carrier scheduling is configured for the UE, TCI presence information is set to "enabled" for the CORESET for the UE, when at least one of TCI states configured relative to a serving cell scheduled by the search space set includes QCL type D, the UE may assume that time offset between a detected PDCCH and a PDSCH corresponding to the PDCCH is equal to or greater than a threshold value.

(Multiple TRPs)

In NR, a scheme in which one or a plurality of transmission/reception points (TRPs) (multiple TRPs) perform DL transmission to a UE by using one or a plurality of panels (multiple panels) has been under study. A scheme in which the UE performs UL transmission to one or a plurality of TRPs has been under study.

Note that the plurality of TRPs may correspond to the same cell identifier (ID), or may correspond to different cell IDs. The cell ID may be a physical cell ID, or may be a virtual cell ID.

FIGS. 2A to 2D are diagrams to show examples of a multi-TRP scenario. In these examples, it is assumed that each TRP can transmit four different beams, but this is not restrictive.

Figure 2A:
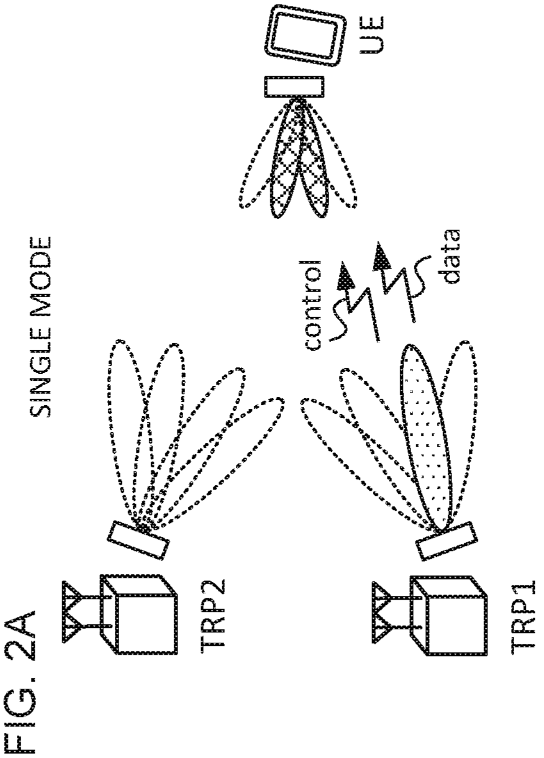
FIGS. 2A to 2D are diagrams to show examples of a multi-TRP scenario.

FIG. 2A shows an example of a case (which may be referred to as a single mode, a single TRP, or the like) where only one TRP (in the present example, TRP 1) out of the multiple TRPs performs transmission to the UE. In this case, TRP 1 transmits both a control signal (PDCCH) and a data signal (PDSCH) to the UE.

Figure 2B:
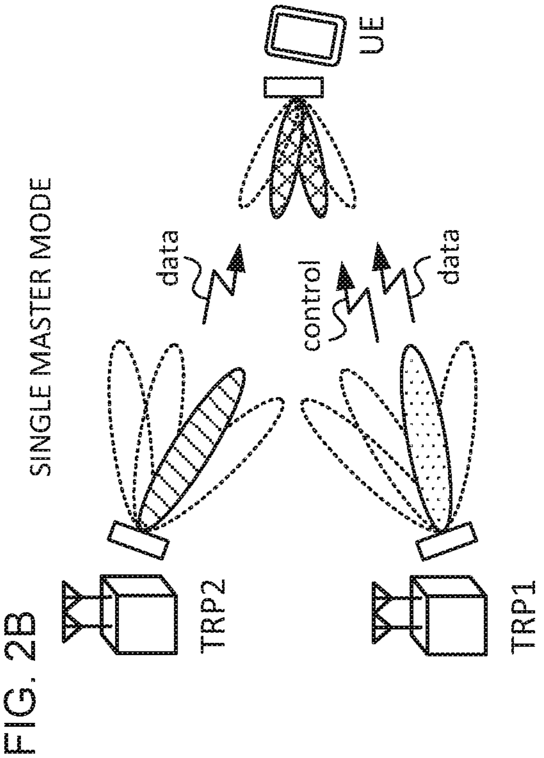

FIG. 2B shows an example of a case (which may be referred to as a single master mode) where only one TRP (in the present example, TRP 1) out of the multiple TRPs transmits a control signal to the UE and the multiple TRPs transmit data signals. The UE receives each PDSCH transmitted from the multiple TRPs, based on one piece of downlink control information (DCI).

Figure 2C:
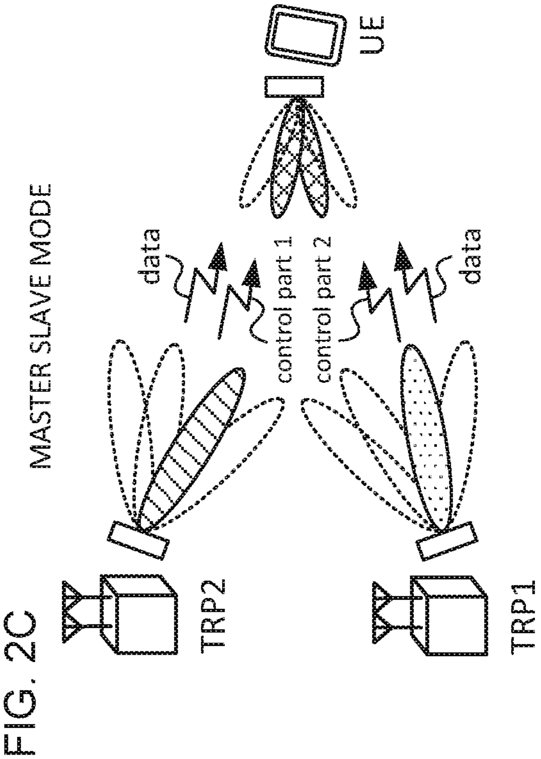

FIG. 2C shows an example of a case (which may be referred to as a master slave mode) where each of the multiple TRPs transmits part of a control signal to the UE and the multiple TRPs transmit data signals. In TRP 1, part 1 of the control signal (DCI) may be transmitted, and in TRP 2, part 2 of the control signal (DCI) may be transmitted. Part 2 of the control signal may depend on part 1. The UE receives each PDSCH transmitted from the multiple TRPs, based on these parts of DCI.

Figure 2D:
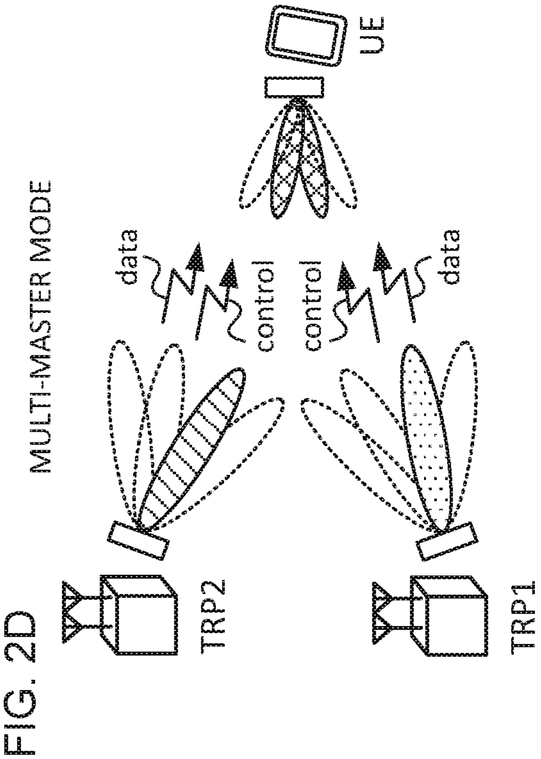

FIG. 2D shows an example of a case (which may be referred to as a multi-master mode) where each of the multiple TRPs transmits a separate control signal to the UE and the multiple TRPs transmits data signals. In TRP 1, a first control signal (DCI) may be transmitted, and in TRP 2, a second control signal (DCI) may be transmitted. The UE receives each PDSCH transmitted from the multiple TRPs, based on these pieces of DCI.

When a plurality of PDSCHs (which may be referred to as multiple PDSCHs) from the multiple TRPs as shown in FIG. 2B are scheduled with use of one piece of DCI, the DCI may be referred to as single DCI (single PDCCH). When a plurality of PDSCHs from the multiple TRPs as shown in FIG. 2D are each scheduled with use of a plurality of pieces of DCI, these plurality of pieces of the DCI may be referred to as multiple pieces of DCI (multiple PDCCHs).

From each TRP of the multiple TRPs, a different code word (CW) and a different layer may be transmitted. As one form of the multi-TRP transmission, non-coherent joint transmission (NCJT) has been under study.

In NCJT, for example, TRP 1 performs modulation mapping of the first code word and performs layer mapping so as to transmit the first PDSCH by using first precoding for a first number of layers (for example, two layers). TRP 2 performs modulation mapping of the second code word and performs layer mapping so as to transmit the second PDSCH by using second precoding for a second number of layers (for example, two layers).

Note that it may be defined that the plurality of PDSCHs (multiple PDSCHs) subjected to NCJT partially or entirely overlap regarding at least one of the time and frequency domains. In other words, at least one of time and frequency resources of the first PDSCH from the first TRP and the second PDSCH from the second TRP may overlap.

It may be assumed that these first PDSCH and second PDSCH are not in a relationship of quasi-co-location (QCL) (not quasi-co-located). Reception of the multiple PDSCHs may be interpreted as simultaneous reception of PDSCHs other than a certain QCL type (e.g., QCL type D).

According to the multi-TRP scenario as described above, more flexible transmission control using channels with satisfactory quality can be performed.

However, in NR specifications thus far, multiple panels/TRPs are not considered, and thus an QCL assumption in a case where the multiple panels/TRPs are used cannot be appropriately controlled.

Figure 3:
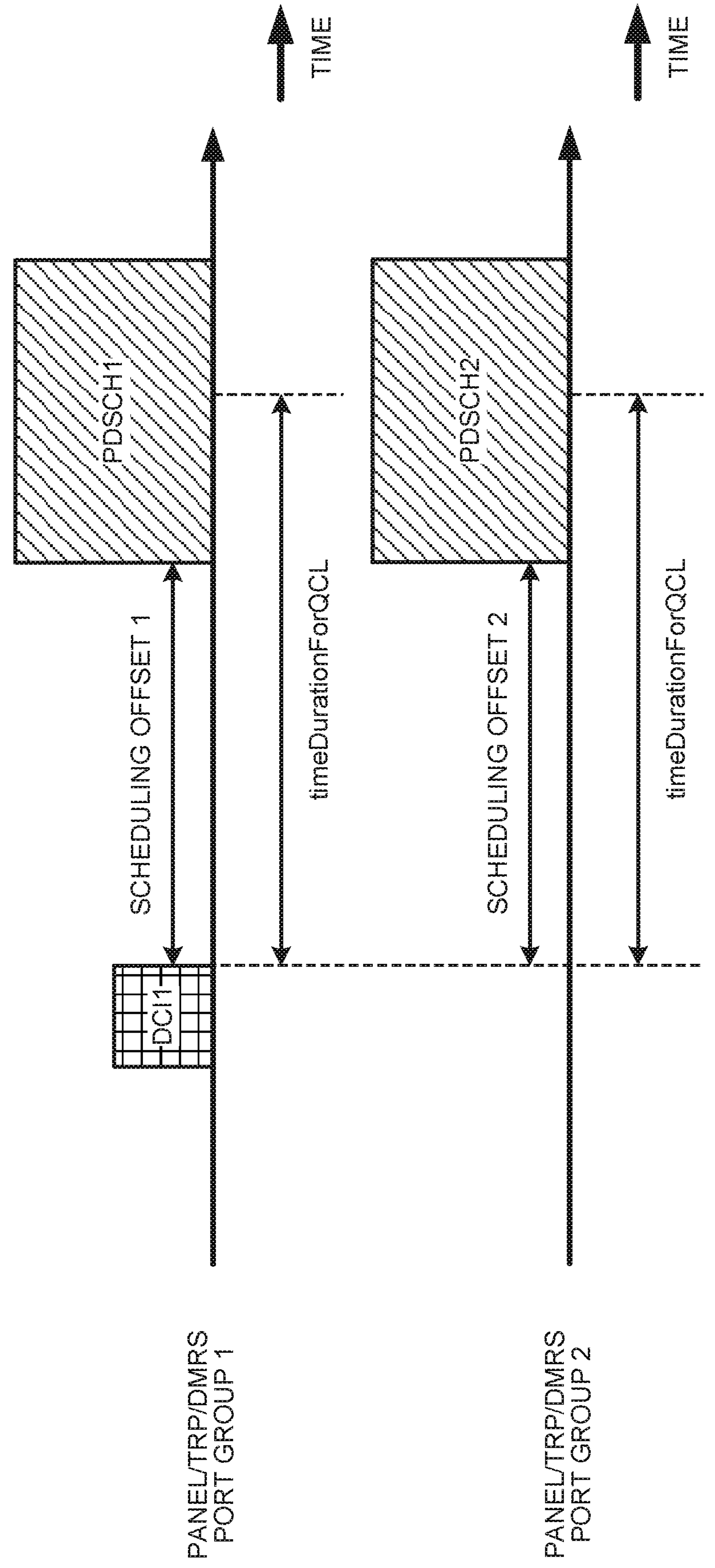
FIG. 3 is a diagram to show a technical challenge in an QCL assumption for a DMRS port for a PDSCH in a case where multiple panels/TRPs are used.

FIG. 3 is a diagram to show a technical challenge in the QCL assumption for the DMRS port for the PDSCH in a case where the multiple panels/TRPs are used. The present example corresponds to the example of the single PDCCH shown in FIG. 2B.

The UE receives DCI 1 and PDSCH 1 transmitted from panel 1 (or TRP 1 or DMRS port group 1). The UE receives PDSCH 2 transmitted from panel 2 (or TRP 2 or DMRS port group 2).

DCI 1 schedules reception of PDSCH 1 and PDSCH 2. Scheduling offset 1 from reception of DCI 1 to PDSCH 1 is less than the scheduling offset threshold value. Scheduling offset 2 from reception of DCI 1 to PDSCH 2 is less than the scheduling offset threshold value.

In the example of FIG. 3, studies of how to assume QCL of PDSCH 1 and PDSCH 2 have not been proceeded thus far. Accordingly, following existing NR specifications cannot preferably achieve spatial diversity gain, high rank transmission, and the like in a case where the multiple panels/TRPs are used, and thus an increase in communication throughput may be suppressed.

Thus, the inventors of the present invention came up with the idea of a QCL assumption capable of supporting the case where the multiple panels/TRPs are used.

Embodiments according to the present disclosure will be described in detail with reference to the drawings as follows. The radio communication methods according to respective embodiments may each be employed individually, or may be employed in combination.

Note that in the present disclosure, a panel, an Uplink (UL) transmission entity, a TRP, a spatial relation, a control resource set (COntrol REsource SET (CORESET)), a PDSCH, a codeword, a base station, a certain antenna port (e.g., a demodulation reference signal (DMRS) port), a certain antenna port group (e.g., a DMRS port group), a certain group (e.g., a code division multiplexing (CDM) group, a certain reference signal group, or a CORESET group), and the like may be interchangeably interpreted. A panel identifier (ID) and a panel may be interchangeably interpreted. A TRP ID and a TRP may be interchangeably interpreted.

In the present disclosure, NCJT, NCJT using multiple TRPs, multiple PDSCHs using NCJT, multiple PDSCHs, a plurality of PDSCHs from multiple TRPs, and the like may be interchangeably interpreted. Note that the multiple PDSCHs may mean a plurality of PDSCHs in which at least parts (e.g., 1 symbol) of time resources overlap with each other, or may mean a plurality of PDSCHs in which all (e.g., all symbols) of time resources overlap with each other. In other words, the UE may receive the multiple PDSCHs at an overlapping timing, or may receive the multiple PDSCHs at the same time.

(Radio Communication Method)

Embodiments below describe a TCI state or QCL (QCL assumption) applied to the PDSCH (or DMRS for the PDSCH) in a case where time offset (scheduling offset) between reception of DL DCI and reception of the PDSCH corresponding to the DCI is less than the scheduling offset threshold value. The TCI state or QCL (QCL assumption) assumed by the UE to be applied to the PDSCH (or DMRS for the PDSCH) in a case where the scheduling offset is less than the scheduling offset threshold value may be referred to as a default TCI state. The default TCI state, default QCL, a default QCL assumption, and the like may be interchangeably interpreted. Hereinafter, this TCI state or QCL (QCL assumption) is expressed as the default TCI state, but the designation is not limited to this.

Note that the definition of the default TCI state is not limited to this. For example, the default TCI state may be a TCI state assumed in a case where a TCI state/QCL designated by DCI with respect to a certain channel/signal (e.g., a PDSCH) is not available, or may be a TCI state assumed in a case where a TCI state/QCL is not designated (or configured).

The UE may judge the default TCI state for either or both of multiple PDSCHs scheduled with use of a single PDCCH on the basis of at least one of the following:

(1) the same rule (an QCL assumption for a CORESET related to the lowest CORESET-ID in the latest slot) as that of Rel. 15 NR, (2) an QCL assumption for the above-described single PDCCH, (3) a TCI state with a TCI state ID with respect to a corresponding panel (in other words, a TCI state for a corresponding panel indicated by the TCI field) out of TCI states corresponding to TCI code points designated by a TCI field for the above-described single PDCCH, (4) a TCI state corresponding to a specific TCI code point capable of being designated by a TCI field for the above-described single PDCCH, and (5) a TCI state for a specific TCI state ID with respect to a corresponding panel out of all TCI states corresponding to code points capable of being designated by a TCI field for the above-described single PDCCH.

Note that in the present disclosure, "specific," "the lowest," "the highest," "the M-th from lowest" (M is an integer), and "the M th from highest" may be interchangeably interpreted. A "TCI code point," a "TCI field code point," a "TCI field value" and the like may be interchangeably interpreted.

In a case of the above-described (1), the UE may judge that the default TCI state for either or both of the multiple PDSCHs scheduled with use of the single PDCCH is an QCL assumption for a CORESET related to the lowest CORESET-ID in the latest slot in which one or more CORESETs within an active BWP in a certain serving cell are configured for the UE.

In a case of the above-described (2), the UE may assume that the default TCI state for either or both of the multiple PDSCHs scheduled with use of the single PDCCH is QCL with an RS (e.g., a PDCCH DMRS) in a TCI state for a PDCCH corresponding to the single PDCCH.

In a case of the above-described (3), a TCI state applied to either or both of the multiple PDSCHs in a case where the scheduling offset is equal to or greater than the scheduling offset threshold value can be the same as that in a case where the scheduling offset is less than the scheduling offset threshold value.

In a case of the above-described (4), for example, the "specific TCI code point" may be the lowest TCI code point out of TCI code points indicating an arbitrary number of TCI states (in other words, out of all TCI code points) (4-1), or may be the lowest TCI code point out of TCI code points indicating two TCI states (4-2).

Note that the X th (X is one or more) code point may be interpreted as the X th TCI state activated by a MAC CE (e.g., TCI state activation/deactivation for UE-specific PDSCH MAC CE) for a PDSCH (or multiple PDSCHs), or may be interpreted as a TCI state for the X th PDSCH configured by RRC signaling.

All TCI states of the above-described (5) corresponding to the code points capable of being designated may mean all TCI states activated by a MAC CE, or may be interpreted as all TCI states for PDSCHs configured by RRC signaling.

Note that the TCI state may be activated or configured in connection with a cell/BWP.

Hereinafter, in a case where PDSCHs for a plurality of TRPs are scheduled by one PDCCH (that is, multiple PDSCHs are scheduled with use of a single PDCCH), a case (also referred to as case 1) where the UE assumes each default TCI state for the multiple PDSCHs on the basis of the same source QCL or the same rule and a case (also referred to as case 2) where the UE assumes each default TCI state for the multiple PDSCHs on the basis of different source QCL or different rules will be respectively described.

Adopting case 1 can unify the rules, and thus achievement of suppression of an increase in UE load is expected. Adopting case 2 can separately determine QCL assumptions for different TRPs, and thus performance improvement is expected. Note that information related to which of case 1 or 2 is used, which rule (e.g., the above-described (1) to (5)) the UE judges the default TCI state on the basis of, or the like may be determined on the basis of higher layer signaling, or may be determined on the basis of a UE capability.

<Case 1>

[Applying Above-Described (4-1) to Both of Multiple PDSCHs]

The UE may assume that a default TCI state for the multiple PDSCHs is a TCI state (or the first TCI state activated by a MAC CE) corresponding to the lowest TCI code point (e.g., TCI field="000").

Here, when the TCI state corresponding to the lowest TCI code point is one TCI state (for one panel), the UE may assume that single TRP transmission is applied by a single PDCCH. In other words, when the TCI state corresponding to the lowest TCI code point is one TCI state, the UE may receive only either of the multiple PDSCHs on the basis of the one TCI state even when reception of the multiple PDSCHs is scheduled by the single PDCCH.

Note that when TCI states corresponding to a certain TCI code point are two TCI states (for two panels), the UE may assume that one of the two TCI states (e.g., the first TCI state) is applied to the first TRP (one of the multiple PDSCHs) and the other (e.g., the second TCI state) is applied to the second TRP (the other of the multiple PDSCHs).

Figures 4A, 4B:
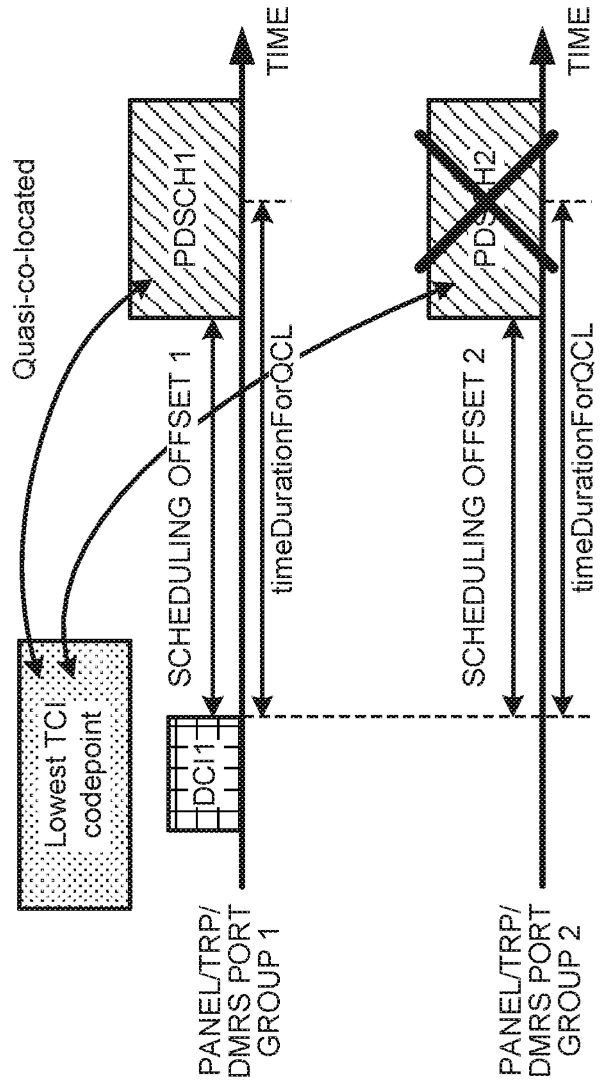
FIGS. 4A and 4B are diagrams to show an example of a case where the lowest TCI code point is applied to a default TCI state for multiple PDSCHs.

FIGS. 4A and 4B are diagrams to show an example of a case where the lowest TCI code point is applied to the default TCI state for the multiple PDSCHs. The example of FIG. 4A is similar to the example of FIG. 3 except a default TCI state assumption, and thus overlapping contents will not be described repetitively (note that a similar example will also be used in the drawings below).

FIG. 4B shows an example of correspondence between TCI code points and TCI states of a TCI field of DCI 1 assumed in the example of FIG. 4A. The lowest TCI code point is "000," and a TCI state corresponding to this is one TCI state with TCI state ID=T2. Note that TCI state ID=TX (X is an integer) may be interpreted as TCI state ID=X. "TCI state ID=TX" and "TCI state with TCI state ID=TX" may be interchangeably interpreted.

In FIG. 4A, both of scheduling offsets 1 and 2 are less than the scheduling offset threshold value. On the other hand, the TCI state corresponding to the lowest TCI code point is one TCI state, and thus the UE may assume that the default TCI state for PDSCH 1 of FIG. 4A is TCI state ID=T2, and may assume that PDSCH 2 is not transmitted (or is not received, is skipped in reception, or is muted).

Note that when the TCI state is one piece, a default TCI state for one with a lower (or higher) panel ID out of the multiple PDSCHs may be assumed to be the TCI state.

Note that DCI 1 may be transmitted by a CORESET with the lowest CORESET-ID for panel 1, or may be transmitted by another CORESET (similarly, in the drawings below, even when CORESET and DCI are described, the DCI may be included in the CORESET, or may not be included).

The above-described (4-1) is expected to be preferable for a case where the UE does not have enough time to decode DCI (e.g., the UE cannot identify whether a TCI field of the DCI indicates a single TRP or indicates multiple TRPs).

[Applying Above-Described (4-2) to Both of Multiple PDSCHs]

The UE may assume that a default TCI state for the multiple PDSCHs is the lowest TCI code point out of TCI code points with two corresponding TCI states.

Figures 5A, 5B:
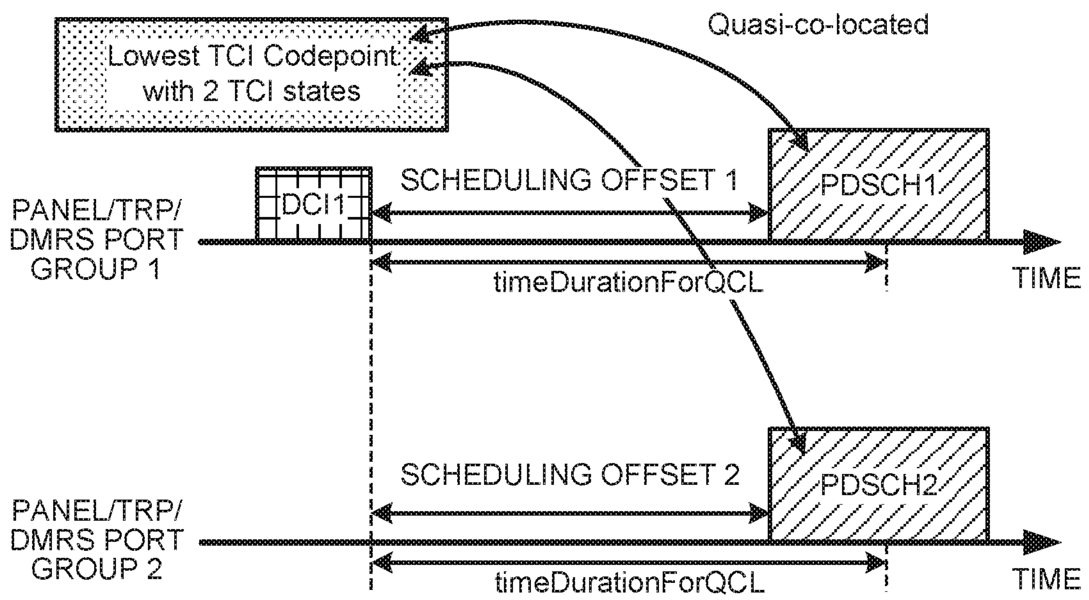
FIGS. 5A and 5B are diagrams to show an example of a case where the lowest TCI code point indicating two TCI states is applied to the default TCI state for multiple PDSCHs.

FIGS. 5A and 5B are diagrams to show an example of a case where the lowest TCI code point indicating two TCI states is applied to the default TCI state for the multiple PDSCHs. The example of FIG. 5A is similar to the example of FIG. 3.

FIG. 5B shows an example of correspondence between TCI code points and TCI states of a TCI field of DCI 1 assumed in the example of FIG. 5A. The lowest TCI code point indicating two TCI states is "001," and two TCI states corresponding to this are TCI state IDs=T0 and T1.

In this case, the UE may assume that the default TCI state for PDSCHs 1 and 2 of FIG. 5A is indicated with TCI code point "001." In other words, the UE may apply TCI state ID=T0 to PDSCH 1, and may apply TCI state ID=T1 to PDSCH 2.

The above-described (4-2) is expected to be preferable for a case where the UE has enough time to decode DCI (e.g., the UE can identify whether a TCI field of the DCI indicates a single TRP or indicates multiple TRPs).

[Applying Above-Described (5) to Both of Multiple PDSCHs]

The UE may assume that a default TCI state for each panel for the multiple PDSCHs is the lowest TCI state ID with respect to a corresponding panel out of all TCI states corresponding to TCI code points.

Figures 6A, 6B:
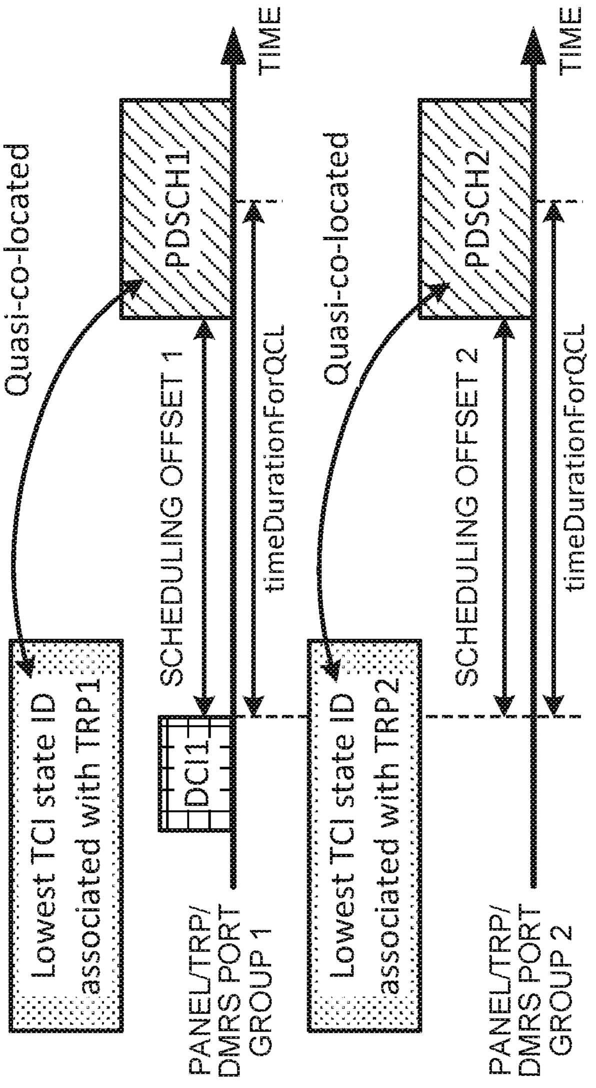
FIGS. 6A and 6B are diagrams to show an example of a case where the lowest TCI state ID for a corresponding panel is applied to the default TCI state for multiple PDSCHs.

FIGS. 6A and 6B are diagrams to show an example of a case where the lowest TCI state ID for the corresponding panel is applied to the default TCI state for the multiple PDSCHs. The example of FIG. 6A is similar to the example of FIG. 3.

FIG. 6B shows an example of correspondence between TCI code points and TCI states of a TCI field of DCI 1 assumed in the example of FIG. 6A. In FIG. 6B, active TCI states with respect to TRP 1 are {T0, T2, T5, T8, T10, T14, T16, and T22}, and thus the lowest TCI state ID for TRP 1 is T0. Active TCI states with respect to TRP 2 are {T4, T1, and T23}, and thus the lowest TCI state ID for TRP 2 is T1.

In this case, the UE may apply TCI state ID=T0 to PDSCH 1 of FIG. 6A, and may apply TCI state ID=T1 to PDSCH 2.

<Case 2>

Hereinafter, as an illustrative example of case 2, a case where a default TCI state for one of the multiple PDSCHs (e.g., a PDSCH transmitted from the same TRP as a TRP corresponding to single DCI to schedule the multiple PDSCHs) is determined on the basis of the above-described (1) and a default TCI state for the other of the multiple PDSCHs is determined on the basis of any one of the above-described (2) to (5) will be described.

In other words, the UE may judge the default TCI state in accordance with Rel. 15 NR with respect to a PDSCH corresponding to a TRP in which a PDCCH (e.g., a single PDCCH) is transmitted, and may judge the default TCI state on the basis of rules defined in Rel. 16 (or later versions) NR (e.g., the above-described (2) to (5)) with respect to a PDSCH corresponding to a TRP other than that (PDSCH corresponding to a TRP in which the above-described PDCCH is not transmitted).

Note that a combination of the rules for determination of the default TCI state for each PDSCH is not limited to this.

[Applying Above-Described (1) to One of Multiple PDSCHs and Applying Above-Described (2) to Other of Multiple PDSCHs]

Figures 7A, 7B:
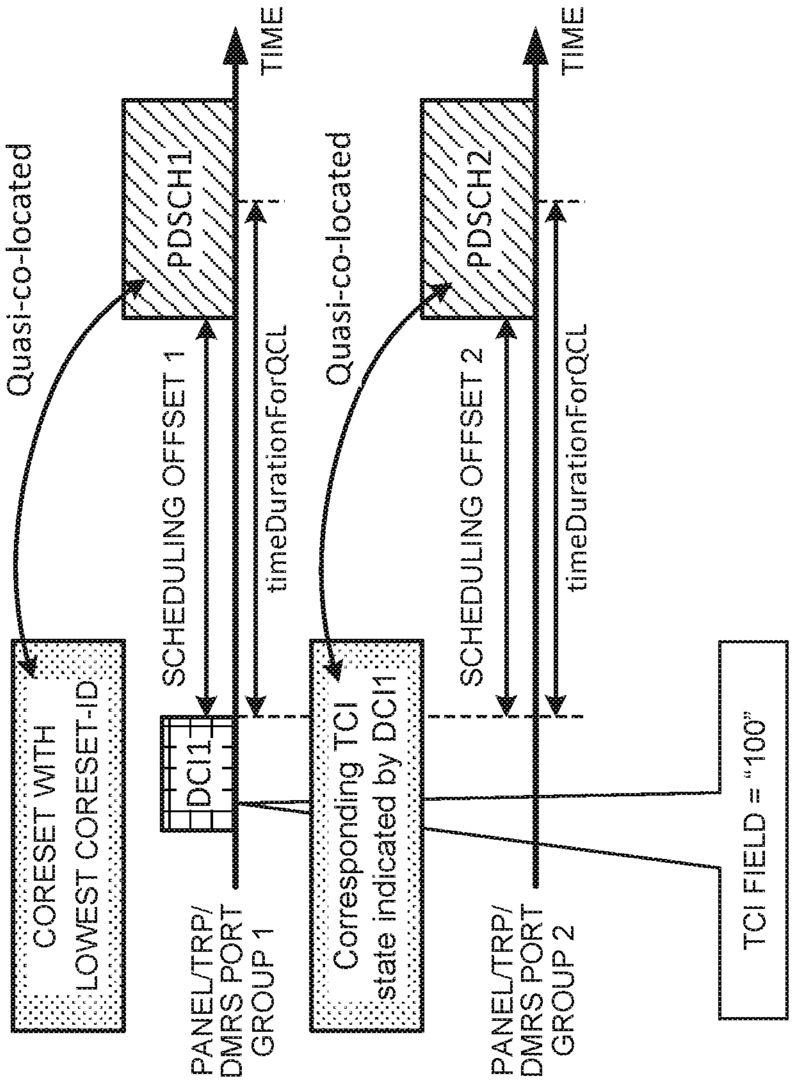
FIGS. 7A and 7B are diagrams to show an example of a case where each default TCI state for multiple PDSCHs is determined on the basis of different rules.

FIGS. 7A and 7B are diagrams to show an example of a case where each default TCI state for the multiple PDSCHs is determined on the basis of different rules. The UE applies the above-described (1) and (2) to PDSCH 1 for TRP 1 and PDSCH 2 for TRP 2 out of the multiple PDSCHs, respectively.

FIG. 7B shows an example of correspondence between TCI code points and TCI states of a TCI field of DCI 1 assumed in the example of FIG. 7A. In the example of FIG. 7A, it is assumed that a TCI field value of DCI 1="100." According to FIG. 7B, the value is "100," and TCI states corresponding to this are TCI state IDs=T10 and T11.

The UE may assume that a DMRS port for PDSCH 1 is QCL with a CORESET with the lowest CORESET-ID in the latest slot in which a CORESET for panel 1 is configured.

The UE may assume that a DMRS port for PDSCH 2 is QCL with an RS in TCI state T11 corresponding to panel 2 (T10 may correspond to panel 2) out of TCI state IDs indicated by an indicated TCI field.

[Applying Above-Described (1) to One of Multiple PDSCHs and Applying Above-Described (4-2) to Other of Multiple PDSCHs]

Figures 8A, 8B:
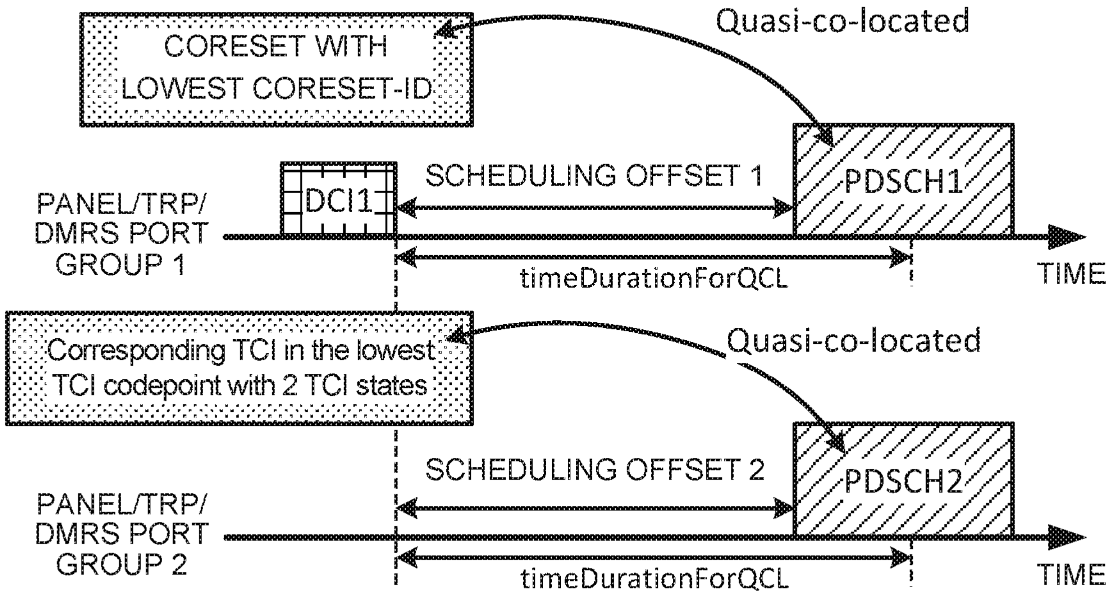
FIGS. 8A and 8B are diagrams to show an example of a case where each default TCI state for multiple PDSCHs is determined on the basis of different rules.

FIGS. 8A and 8B are diagrams to show an example of a case where each default TCI state for the multiple PDSCHs is determined on the basis of different rules. The UE applies the above-described (1) and (4-2) to PDSCH 1 for TRP 1 and PDSCH 2 for TRP 2 out of the multiple PDSCHs, respectively.

FIG. 8B shows an example of correspondence between TCI code points and TCI states of a TCI field of DCI 1 assumed in the example of FIG. 8A. The lowest TCI code point indicating two TCI states is "001," and two TCI states corresponding to this are TCI state IDs=T0 and T1.

The UE may assume that the DMRS port for PDSCH 1 is QCL with a CORESET with the lowest CORESET-ID in the latest slot in which a CORESET for panel 1 is configured.

The UE may assume that the DMRS port for PDSCH 2 is QCL with an RS in TCI state T1 corresponding to panel 2 (T0 may correspond to panel 2) out of TCI state IDs indicated by the lowest TCI code point "001" indicating the two TCI states.

[Applying Above-Described (1) to One of Multiple PDSCHs and Applying Above-Described (5) to Other of Multiple PDSCHs]

Figures 9A, 9B:
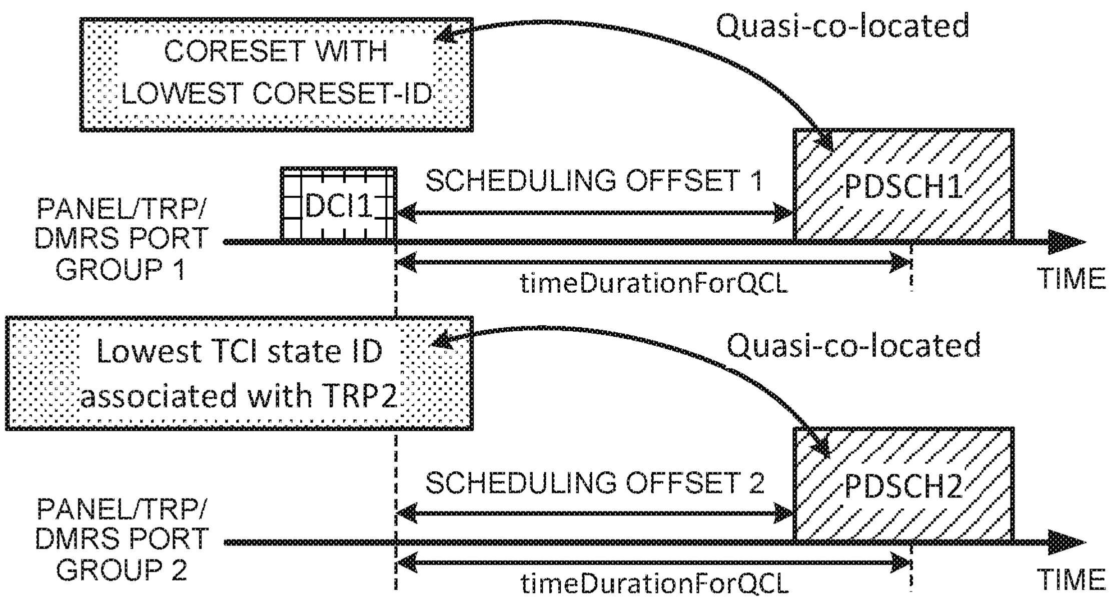
FIGS. 9A and 9B are diagrams to show an example of a case where each default TCI state for multiple PDSCHs is determined on the basis of different rules.

FIGS. 9A and 9B are diagrams to show an example of a case where each default TCI state for the multiple PDSCHs is determined on the basis of different rules. The UE applies the above-described (1) and (5) to PDSCH 1 for TRP 1 and PDSCH 2 for TRP 2 out of the multiple PDSCHs, respectively.

FIG. 9B shows an example of correspondence between TCI code points and TCI states of a TCI field of DCI 1 assumed in the example of FIG. 9A. Active or configured TCI states with respect to TRP 2 are {T3, T1, and T23}, and thus the lowest TCI state ID for TRP 2 is T1.

The UE may assume that the DMRS port for PDSCH 1 is QCL with a CORESET with the lowest CORESET-ID in the latest slot in which a CORESET for panel 1 is configured.

The UE may assume that the DMRS port for the PDSCH 2 is QCL with an RS in TCI state T1 corresponding to the lowest TCI state ID for TRP 2.

According to the embodiments described above, it is possible to appropriately determine each default TCI state related to multiple PDSCHs in a case where scheduling offset is less than the scheduling offset threshold value.

OTHER EMBODIMENT

Whether a PDSCH is a single TRP-based PDSCH or a multiple TRPs-based PDSCH may be semi-statically configured for a UE. For example, the UE may assume that PDSCHs to be scheduled are multiple PDSCHs when a higher layer parameter "tci-PresentInDCI" is configured to "enabled." The UE may assume that a PDSCH to be scheduled is a single PDSCH (PDSCH from a single TRP) when the higher layer parameter "tci-PresentInDCI" is not configured to "enabled" (also simply described hereinafter as "tci-PresentInDCI is not configured").

The UE may assume that a PDSCH is always scheduled by the single TRP (or is a single PDSCH, or one TCI state is applied to the PDSCH) when "tci-PresentInDCI" is not configured. On the other hand, when "tci-PresentInDCI" is configured, the UE can dynamically switch between assumptions for the single TRP and multiple TRPs with respect to PDSCHs on the basis of a TCI field of DCI.

The UE may assume that PDSCHs are always scheduled by the multiple TRPs (or are multiple PDSCHs, or a plurality of TCI states are applied to the PDSCHs) when "tci-PresentInDCI" is not configured. In this case, the multiple TRPs can be applied to the PDSCHs without configuring "tci-PresentInDCI" (without preparing a TCI field). Reducing the DCI for the TCI field improves an error rate of the DCI, and thus a link budget of the DCI can be improved and coverage of the DCI can be improved.

When "tci-PresentInDCI" is not configured, the UE may assume that whether the PDSCH is always scheduled by the single TRP (or is a single PDSCH, or one TCI state is applied to the PDSCH) or the PDSCHs are always scheduled by the multiple TRPs (or are multiple PDSCHs, or a plurality of TCI states are applied to the PDSCHs) is notified/configured by a higher layer parameter. Therefore, it is possible to switch between the single TRP and multiple TRPs in a higher layer without configuring "tci-PresentInDCI."

The UE may assume that the PDSCHs are multiple PDSCHs when single DCI and multiple TRPs (or multiple PDSCHs) are configured by the higher layer parameter. For example, the UE may assume that PDSCHs to be scheduled are multiple PDSCHs when TCI states (or a TCI state list) for multiple TRPs for PDSCHs are configured or when time/frequency resources for respective PDSCHs with respect to a plurality of TRPs are configured.

When DCI to schedule PDSCHs is single DCI for multiple TRPs, the UE may assume that the PDSCHs are multiple PDSCHs.

The UE may assume that DCI satisfying at least one of the following is single DCI for multiple TRPs:

- including one or a plurality of TCI fields for a plurality of TRPs to designate respective TCI states for a plurality of TRPs,
- including one or a plurality of fields to designate respective DMRS ports for a plurality of PDSCHs, and
- including one or a plurality of fields to designate respective time/frequency resources for a plurality of PDSCHs.

The UE may judge a QCL assumption in accordance with Rel. 15 NR to assume single TRP transmission when "tci-PresentInDCI" is not configured.

When "tci-PresentInDCI" is configured, the UE may determine whether single TRP transmission or multi-TRP transmission on the basis of designation of a TCI state for DCI (e.g., a TCI field), and may judge a default TCI state for the multiple TRPs in accordance with at least one of the above-mentioned embodiments.

When "tci-PresentInDCI" is not configured, the UE may determine whether single TRP transmission or multi-TRP transmission on the basis of a field (which may be referred to as, for example, a TRP number field and so on) to designate whether single TRP transmission or multi-TRP transmission included in DCI.

When "tci-PresentInDCI" is not configured, the UE may assume that whether single TRP is always assumed or multi-TRP transmission is always assumed is switched depending on a higher layer parameter.

When single TRP transmission is designated/configured, the UE may judge the QCL assumption in accordance with Rel. 15 NR, and when multi-TRP transmission is designated/configured, the UE may judge the default TCI state in accordance with at least one of the above-mentioned embodiments.

Note that the above-mentioned embodiments describe examples of the single PDCCH, but the respective embodiments of the present disclosure may be employed in multiple PDCCHs.

Note that the scheduling offset 1 and 2 shown in the respective embodiments of the present disclosure may be equal to each other, or may be different from each other.

A case where the scheduling offset threshold value shown in the respective embodiments of the present disclosure is common regardless of panels is shown, but the scheduling offset threshold value may differ for each panel.

How to give CORESET-ID indices (indexing) may be common (global) to all panels (or TRPs or DMRS port groups), or may be independent for each panel (or TRP or DMRS port group).

Note that the DMRS port group may be associated for each CORESET (e.g., an RRC information element "ControlResourceSet" may include information about the DMRS port group). Configuration information about the DMRS port group may include information about a corresponding CORESET. For example, information indicating that DMRS port group 1 corresponds to CORESET-IDs 1 and 2 may be configured by the configuration information about the DMRS port group.

The DMRS port group of the present disclosure may include at least one of a DMRS port group for PDSCHs, a DMRS port group for PDCCHs, a DMRS port group for PBCHs, and a DMRS port group for another channel.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
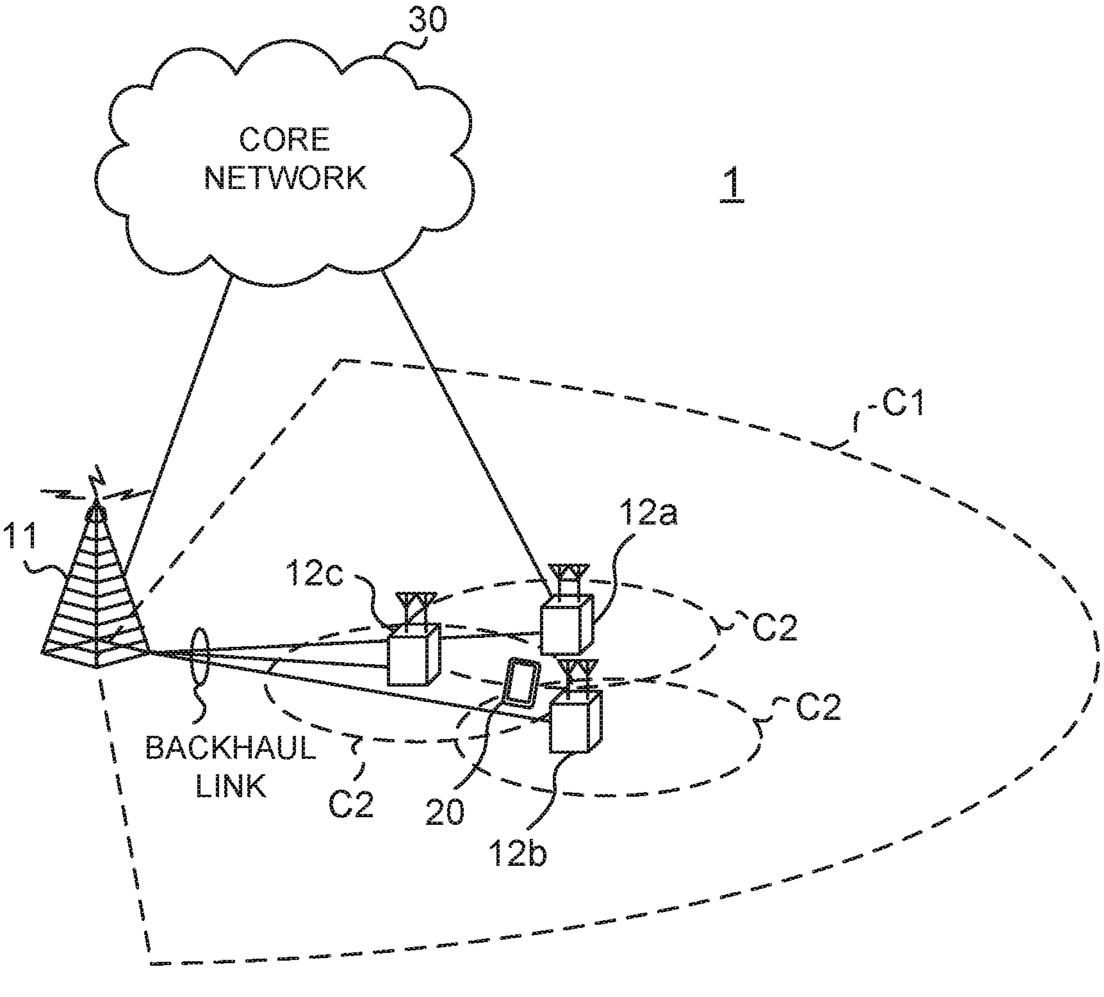
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
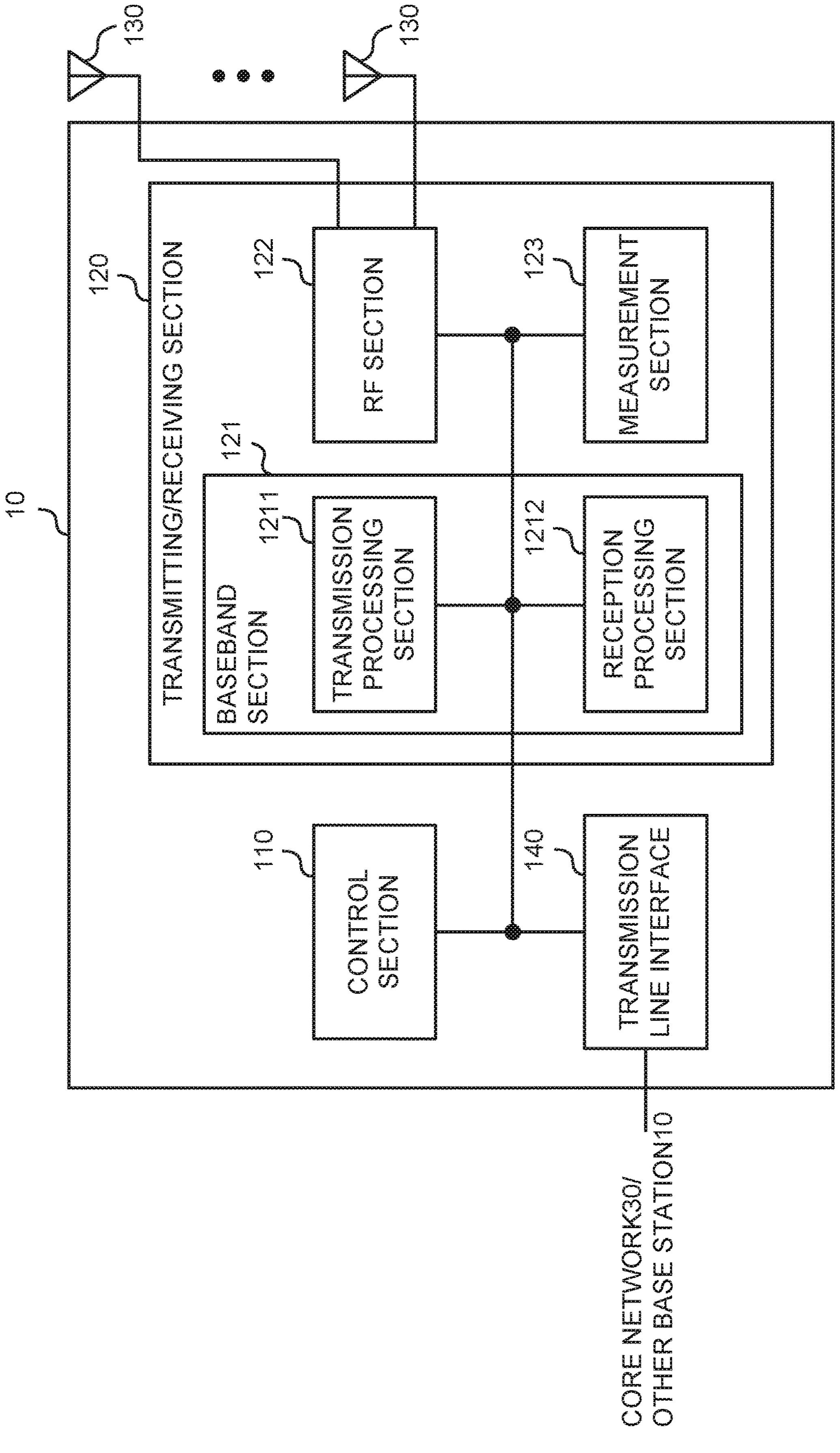
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RPM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit either or both of a plurality of downlink shared channels (Physical Downlink Shared Channels (PDSCHs)) (multiple PDSCHs) scheduled on the basis of one piece of downlink control information (single PDCCH).

(User Terminal)

Figure 12:
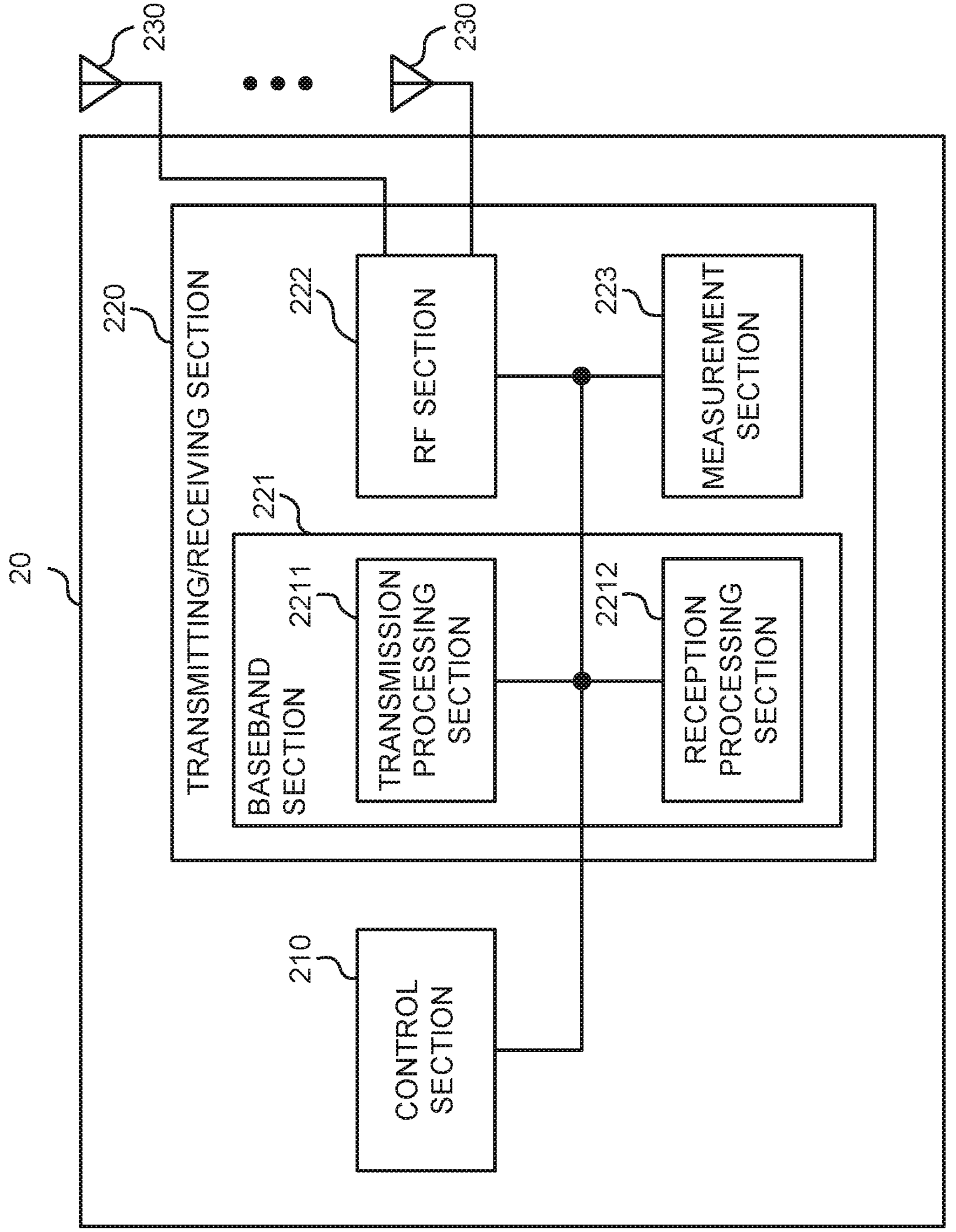
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive a plurality of downlink shared channels (Physical Downlink Shared Channels (PDSCHs)) (multiple PDSCHs) on the basis of one piece of downlink control information (single PDCCH).

The control section 210 may judge that a default transmission configuration indication state (TCI state) applied to the plurality of the PDSCHs corresponds to at least one of TCI states corresponding to one or a plurality of code points in a TCI field for the downlink control information.

The control section 210 may judge that the default TCI state corresponds to a TCI state corresponding to the code point being lowest.

The control section 210 may judge that the default TCI state related to a certain panel corresponds to a TCI state with a lowest TCI state identifier with respect to the panel out of all TCI states corresponding to the code point.

The control section 210 may judge the default TCI state related to a certain panel and the default TCI state related to another panel on the basis of a same rule.

The control section 210 may judge the default TCI state related to a certain panel and the default TCI state related to another panel on the basis of different rules.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
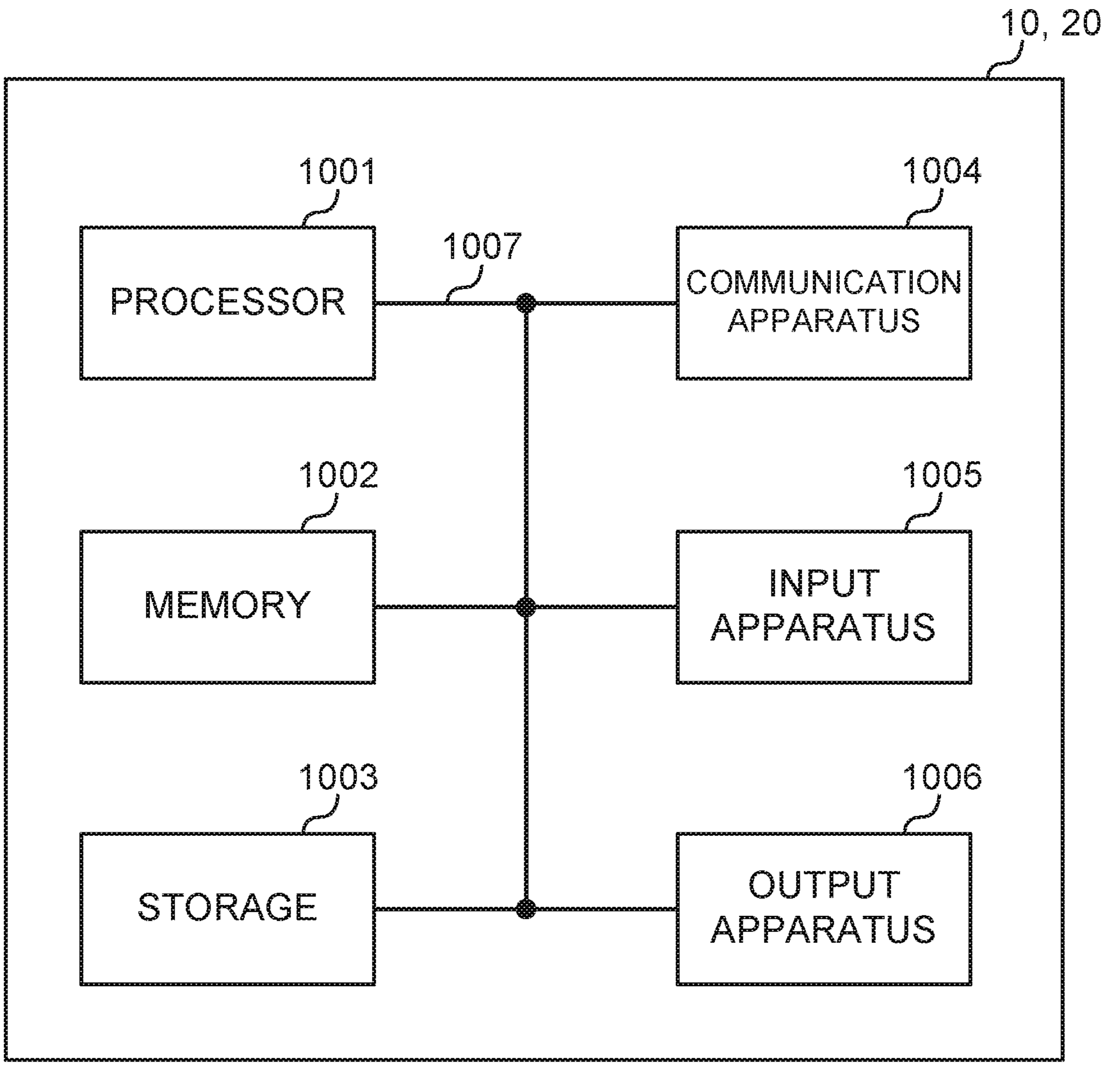
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term “judging (determining)” as in the present disclosure herein may encompass a wide variety of actions. For example, “judging (determining)” may be interpreted to mean making “judgments (determinations)” about judging, calculating, computing, processing, deriving, investigating, looking up, search and inquiry (for example, searching a table, a database, or some other data structures), ascertaining, and so on.

Furthermore, “judging (determining)” may be interpreted to mean making “judgments (determinations)” about receiving (for example, receiving information), transmitting (for example, transmitting information), input, output, accessing (for example, accessing data in a memory), and so on.

In addition, “judging (determining)” as used herein may be interpreted to mean making “judgments (determinations)” about resolving, selecting, choosing, establishing, comparing, and so on. In other words, “judging (determining)” may be interpreted to mean making “judgments (determinations)” about some action.

In addition, “judging (determining)” may be interpreted as “assuming,” “expecting,” “considering,” and the like.

The terms “connected” and “coupled,” or any variation of these terms as used in the present disclosure mean all direct or indirect connections or coupling between two or more elements, and may include the presence of one or more intermediate elements between two elements that are “connected” or “coupled” to each other. The coupling or connection between the elements may be physical, logical, or a combination thereof. For example, “connection” may be interpreted as “access.”

In the present disclosure, when two elements are connected, the two elements may be considered “connected” or “coupled” to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase “A and B are different” may mean that “A and B are different from each other.” Note that the phrase may mean that “A and B is each different from C.” The terms “separate,” “be coupled,” and so on may be interpreted similarly to “different.”

When terms such as “include,” “including,” and variations of these are used in the present disclosure, these terms are intended to be inclusive, in a manner similar to the way the term “comprising” is used. Furthermore, the term “or” as used in the present disclosure is intended to be not an exclusive disjunction.

For example, in the present disclosure, when an article such as “a,” “an,” and “the” in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:

a receiver that receives multiple Physical Downlink Shared Channels (PDSCHs) based on a single downlink control information;

a processor that applies one of two Transmission Configuration Indication (TCI) states to one of the multiple PDSCHs from a first transmission/reception point (TRP) and applies other of the two TCI states to other of the multiple PDSCHs from a second TRP; and a transmitter that transmits information on a scheduling offset threshold value regarding a terminal capability, wherein the two TCI states correspond to a lowest TCI codepoint among multiple TCI code points including 8 TCI codepoints indicating two TCI states activated by medium access control control element (MAC CE) in response to a time offset between reception of the downlink control information and reception of a PDSCH corresponding to the downlink control information being less than the scheduling offset threshold value based on higher layer signaling and a beam switching delay.

2. The terminal according to claim 1, wherein the TCI state is a default TCI state applied to the multiple PDSCHs.

3. A radio communication method for a terminal, comprising:

receiving multiple Physical Downlink Shared Channels (PDSCHs) based on a single downlink control information;

applying one of two Transmission Configuration Indication (TCI) states to one of the multiple PDSCHs from a first transmission/reception point (TRP);

applying other of the two TCI states to other of the multiple PDSCHs from a second TRP; and transmitting information on a scheduling offset threshold value regarding a terminal capability, wherein the two TCI states correspond to a lowest TCI codepoint among multiple TCI code point including 8 TCI codepoints indicating two TCI states activated by medium access control control element (MAC CE) in response to a time offset between reception of the downlink control information and reception of a PDSCH corresponding to the downlink control information being less than the scheduling offset threshold value based on higher layer signaling and a beam switching delay.

4. A base station comprising:

a transmitter that transmits multiple Physical Downlink Shared Channels (PDSCHs) scheduled based on a single downlink control information to a terminal;

a processor that assumes that one of two Transmission Configuration Indication (TCI) states applied to one of the multiple PDSCHs from a first transmission/reception point (TRP) and other of the two TCI states applied to other of the multiple PDSCHs from a second TRP; and a receiver that receives information on a scheduling offset threshold value regarding a terminal capability, wherein the two TCI states correspond to a lowest TCI codepoint among multiple TCI code points including 8 TCI codepoints indicating two TCI states activated by medium access control control element (MAC CE) in response to a time offset between reception of the downlink control information and reception of a PDSCH corresponding to the downlink control information being less than the scheduling offset threshold value based on higher layer signaling and a beam switching delay.

5. A system comprising a terminal and a base station, wherein the terminal comprises:

a receiver that receives multiple Physical Downlink Shared Channels (PDSCHs) based on a single downlink control information;

a processor that applies one of two Transmission Configuration Indication (TCI) states to one of the multiple PDSCHs from a first transmission/reception point (TRP) and applies other of the two TCI states to other of the multiple PDSCHs from a second TRP; and a transmitter that transmits information on a scheduling offset threshold value regarding a terminal capability, wherein the two TCI states correspond to a lowest TCI codepoint among multiple TCI code points including 8 TCI codepoints indicating two TCI states activated by medium access control control element (MAC CE) in response to a time offset between reception of the downlink control information and reception of a PDSCH corresponding to the downlink control information being less than the scheduling offset threshold value based on higher layer signaling and a beam switching delay, and the base station comprises:

a transmitter that transmits the multiple PDSCHs to the terminal.

* * * * *